1. LIGHTWEIGHT CONCRETE AGGREGATE IS ADMIXED WITH A LIQUID AQUEOUS MEDIUM SUCH AS WATER TO SUBSTANTIALLY UNIFORMLY DEPOSIT THE SAME IN THE FORM OF A SEPARATE LIQUID PHASE ON THE SURFACE OF THE AGGREGATE PARTICLES IN AN AMOUNT INSUFFICIENT TO FULLY HYDRATE THE HYDRAULIC CEMENT TO BE ADMIXED THEREWITH AND PRODUCE A COHERENT FORMABLE UNCURED CONCRETE MATRIX.

2. DRY HYDRAULIC CEMENT IS ADMIXED WITH THE ADMIXTURE OF LIGHTWEIGHT AGGREGATE AND LIQUID AQUEOUS MEDIUM AT THE RATE OF 200-1000 POUNDS FOR EACH CUBIC YARD OF THE AGGREGATE TO FORM A COATING THEREOF ON THE AGGREGATE PARTICLES AND SUBSTANTIALLY UNIFORMLY DISTRIBUTE THE HYDRAULIC CEMENT THEREIN.

3. ADDITIONAL LIQUID AQUEOUS MEDIUM IS ADMIXED WITH THE ADMIXTURE PREPARED BY STEP 2 IN AN AMOUNT (a) TO FULLY HYDRATE ALL OF THE HYDRAULIC CEMENT, (b) TO PRODUCE A COHERENT FORMABLE UNCURED CONCRETE MATRIX, AND (c) INSUFFICIENT TO SEPARATE FROM THE CONCRETE MATRIX IN THE FORM OF A SEPARATE LIQUID PHASE OF THE AQUEOUS MEDIUM.

4. THE COHERENT FORMABLE CONCRETE MATRIX IS FORMED INTO A BODY OF UNCURED LIGHTWEIGHT CONCRETE HAVING A DESIRED CONFIGURATION.

5. THE BODY OF UNCURED LIGHTWEIGHT CONCRETE IS MAINTAINED IN THE DESIRED CONFIGURATION UNTIL IT SETS.

United States Patent Office 3,764,357
Patented Oct. 9, 1973

3,764,357
METHOD OF PREPARING LIGHTWEIGHT CONCRETE AND PLASTER AND THE LIGHTWEIGHT CONCRETE AND PLASTER THUS PREPARED
Andrew D. Bowles and Samuel J. Parsons, both of Box 2405, Anchorage, Alaska 99501
Filed Mar. 30, 1970, Ser. No. 24,022
Int. Cl. B28b 1/50, 21/04; C04b 21/08
U.S. Cl. 106—90       34 Claims

ABSTRACT OF THE DISCLOSURE

Lightweight concrete and plaster are prepared by a novel method which assures that the aggregate is uniformly admixed with the cementitious material and other relatively heavy ingredients of the concrete and plaster mixes. This is accomplished by wetting the surfaces of the lightweight aggregate particles with an aqueous medium, admixing the wet aggregate particles with dry finely divided cementitious material to form a coating thereon, and thereafter adding additional aqueous medium in an amount to produce a coherent formable uncured concrete or plaster matrix. The uncured concrete or plaster matrix may be formed into a desired configuration, and then is allowed to set in the usual manner. The addition of hydrated lime improves the cohesive properties of an uncured concrete matrix. Increased strength in cured lightweight concrete may be obtained by admixing pozzolan, hydrated lime and/or finely divided inert inorganic fillers such as sand with the uncured concrete matrix. A lightweight aggregate including expanded polystyrene beads is preferred, and further increased strength may be obtained by using polystyrene beads expanded in hot water.

BACKGROUND OF THE INVENTION

This invention broadly relates to the preparation of lightweight concrete and plaster and, more specifically, to a novel method of admixing a uniform lightweight concrete or plaster wherein the aggregate is prevented from separating from cementitious material and other relatively heavy ingredients of the mix. The invention further relates to the improved lightweight concrete and plaster products prepared by the method of the invention.

The methods available heretofore for preparing lightweight concrete and plaster have not been entirely satisfactory. For example, the prior art has not provided a suitable method of admixing lightweight aggregates, which may weigh as little as one to two pounds per cubic foot, with cementitious materials and other heavy ingredients which may weigh as much as 100 pounds per cubic foot. As a result, when practicing the prior art methods, the lighter aggregate tends to separate from the relatively heavy ingredients including the cementitious material during the admixing step, and a uniform formable coherent uncured concrete or plaster matrix is not produced. There is also a tendency for a concrete matrix produced in accordance with prior art methods to undergo stratification when placed in a concrete form and upon curing, a uniform high strength lightweight concrete is not produced.

The present invention overcomes the above-mentioned and other problems of the prior art. When practicing the present invention, the lightweight aggregate is admixed with the cementitious material under carefully controlled conditions which eliminate separation of the lightweight aggregate from heavier ingredients, and a coherent uncured concrete or plaster matrix is produced which may be formed and cured in accordance with prior art practices. The resultant lightweight concrete and plaster are further characterized by unifomity and high strength, and they have predictable weight and strength characteristics.

It is an object of the present invention to provide a novel method of preparing improved high strength lightweight concrete and plaster.

It is a further object to provide a novel method of preparing lightweight concrete and plaster wherein a lightweight aggregate, cementitious material, and other relatively heavy ingredients may be admixed with an aqueous medium under carefully controlled conditions to prepare a uniform coherent formable uncured concrete or plaster matrix which may be cured to produce high strength lightweight products.

It is still a further object to prepare improved high strength lightweight concrete and plaster from an aggregate including expanded polystyrene beads.

It is still a further object to provide a novel method of preparing high strength lightweight concrete and plaster from an aggregate including polystyrene beads expanded in hot water.

It is still a further object to provide the improved lightweight concrete and plaster products prepared by the method of the invention.

Still other objects and advantages of the invention will be apparent to those skilled in the art upon reference to the following detailed description and the examples.

THE DRAWING

The accompanying drawing is a flow sheet illustrating the steps of one presently preferred variant of the method of the invention.

DETAILED DESCRIPTION OF THE INVENTION INCLUDING PREFERRED VARIANTS THEREOF

In accordance with one important variant of the present invention, lightweight concrete and plaster are prepared by wetting the surfaces of particles of a lightweight aggregate with an aqueous medium, and then admixing the particles of wet aggregate with dry finely divided cementitious material to coat the particles therewith. The water contained initially in the wetted aggregate should be insufficient to produce a proper consistency in the uncured concrete matrix. Therefore, additional aqueous medium shoud be admixed with the coated aggregate particles in an amount to produce a cohesive formable uncured concrete matrix or plaster matrix having a desired consistency. Other ingredients may be added to the concrete matrix or plaster matrix when desired. The resulting uncured concrete matrix or plaster matrix is formed into a body of uncured lightweight concrete or plaster having a desired configuration, and is then maintained in the desired configuration until it sets. As will be discussed in greater detail hereinafter, there are certain preferred variants which produce improved results.

A wide variety of lightweight aggregates may be employed in practicing the present invention. Examples of organic lightweight aggregates include expanded polystyrene beads, other types of expanded synthetic polymers, cork, paper, sawdust and wood fibre. Examples of inorganic lightweight aggregates which may be used include vermiculite, asbestos, perlite, fly ash and hollow glass beads. The preferred organic aggregate is expanded polystyrene beads, and often the preferred inorganic aggregate is perlite.

Expanded polystyrene beads are well known to the art, and may be prepared from small pellets or beads of polystyrene containing admixed therewith a heat activated expanding agent such as a volatile hydrocarbon. Examples of suitable hydrocarbons include n-pentane, isopentane and hexane. When the polystyrene particles are placed in dry steam, the polystyrene softens, the expanding agent volatilizes, and the vapor causes the particles to expand to many times their original size. By varying the conditions, the particles may be expanded to about 20–60 times their original size, and are preferably expanded to approximately 40–50 times their original size. After the beads are expanded to the desired size, the expanding agent diffuses into the atmosphere and the beads are ready for use.

The expanded polystyrene beads may vary substantially in particle size. As a general rule, the beads should be less than ½ inch in diameter, and preferably less than ¼ inch. Enhanced strength in the cured concrete and plaster is often obtained with smaller bead sizes, and the beads may have diameters as small as $\frac{1}{32}$–$\frac{1}{64}$ inch, for example. Beads having a Tyler Screen size of about 12–16 mesh are very satisfactory. The weight of the expanded polystyrene beads may vary substantially, but as a general rule is approximately 1–4 pounds per cubic foot. First stage expansion beads often have a weight of approximately two pounds per cubic foot, and second stage expansion beads approximately one pound per cubic foot.

In accordance with one presently preferred variant of the invention, the initial particles of polystyrene including the heat activated expanding agent are expanded by agitating in a body of hot water. The water is sufficiently hot to activate the expanding agent and may be, for example, about 200–212° F. Surprisingly, it has been discovered that the polystyrene beads thus produced may be used in preparing lightweight concrete and plaster which have greatly enhanced strength. For some reason which is not fully understood at the present time, expanding the polystyrene beads in hot water tends to strengthen the skins of the beads, and water or moisture seems to be entrapped within the expanded beads. The water content of the beads seems to be released gradually during the hydration, rehydration or crystallization of the cementitious material, and moisture is not withdrawn therefrom as is apparently true with polystyrene beads expanded in dry steam. Polystyrene beads expanded by dry steam are highly charged with static electricity, while, unexpectedly, polystyrene beads expanded in hot water are not. The size of the hot water-expanded polystyrene beads may be as given above for the steam-expanded polystyrene beads, but the weight per cubic foot may be somewhat higher. As a general rule, it is usually preferred that the hot water-expanded polystyrene beads have a weight of about 3–4 pounds per cubic foot, and for best results about 3.5–3.6 pounds per cubic foot. The increased weight is largely due to the enhanced moisture content of the beads.

Any suitable hydraulic cement may be employed when preparing lightweight concrete in accordance with the present invention. Portland cement is preferred, and it may contain the usual additives. Special types of portland cements may be employed such as portland-pozzolan cement, which is a portland cement to which pozzolana is added during the grinding of the cement clinker. A portland cement identified in the trade as high early strength Portland cement SS C–192, type 3, is especially useful when the lightweight aggregate is expanded polystyrene beads.

Prior art inorganic cementitious materials for plaster may be used when preparing lightweight plaster in accordance with the invention. Examples of suitable cementitious materials are disclosed in the text "Manual of Lathing and Plastering," by John R. Diehl, A.I.A., and include calcined gypsum, hydrated lime, portland cement and admixtures thereof. Calcined gypsum and/or hydrated lime are usually preferred.

The amount of cementitious material to be used may vary over wide ranges and depends to some extent upon the desired strength of the cured lightweight concrete or plaster and the weight thereof. As a general rule, about 200–1,000 pounds of cementitious material is used per cubic yard of lightweight aggregate, and preferably is about 600–800 pounds. However, it is understood that smaller or larger amounts may be used when desired.

The aqueous medium that is used to wet the particles of aggregate prior to admixing the dry inorganic cementitious material therewith, and/or the additional aqueous medium that is admixed with the cement coated aggregate particles may be water, an aqueous emulsion of an organic binder for the aggregate particles, or admixtures thereof. When employing an aqueous emulsion of an organic polymeric binder, it is usually preferred that the particles of aggregate be wetted therewith, followed by coating the wetted aggregate particles with the inorganic cementitious material, and thereafter admixing water with the cement coated aggregate particles to provide the additional water for hydration, rehydration or crystallization required for hydration of the cementitious material and to produce the desired formable cohesive concrete matrix or plaster matrix. The organic polymeric binder may be, for example, an aqueous emulsion or latex of polyvinyl chloride, copolymers of polyvinyl chloride with other ethylenically unsaturated monomers such as vinyl acetate or vinyl alcohol, acrylic resins, polyamides such as nylon, epoxy resins and the like. Aqueous emulsions of organic polymers used in prior art water-based paints, such as, for example, Super Kem-Tone are suitable for use in practicing the present invention. The use of an aqueous medium which contains an organic polymeric binder in emulsion form to wet the aggregate aids in stabilizing the water content thereof, and allows a uniform, controlled thickness of cementitious material to be coated thereon. It is also possible to use organic polymeric binders of this type in sub-zero weather.

The present invention provides a convenient way of controlling the amount of inorganic cementitious material which is deposited in the coating on the aggregate particles, and assures that the particles are uniformly coated. It is possible, for example, to uniformly coat the particles with as little as 200 pounds of inorganic cementitious material per cubic yard of lightweight aggregate, and thereby produce an extremely lightweight concrete or plaster. While concrete and plaster containing 200 pounds of cementitious material per cubic yard have a relatively low strength as compared with concrete and plaster of the invention containing substantially more cementitious material, nevertheless the strength for a given weight and product is higher than may be produced in accordance with the prior art methods of mixing. This is also true of the heavier concretes and plasters of the invention which may contain up to about 1,000 pounds of cementitious material per cubic yard of aggregate.

In accordance with a further variant of the invention, it is possible to build up a plurality of layers of cementitious material on the aggregate particles by repeating the steps of wetting and admixing dry cementitious material with the aggregate particles. For example, uncoated particles of lightweight aggregate may be wetted with the aqueous medium, followed by admixing with dry cementitious material in an amount to produce coated aggregate particles which are dry and free flowing, followed by wetting the individual cement coated particles with the aqueous medium a second time, and thereafter admixing the twice-wetted aggregate particles with additional dry cementitious material. After the desired coating thickness has been reached, then the additional water that is needed for hydration, rehydration, or crystallization of the cementitious material and for producing a formable coherent uncured concrete matrix or plaster matrix may be admixed with the coated particles. Substantially any ratio of cementitious material to aggregate in the uncured concrete matrix or plaster matrix may be obtained by proceeding in the above manner.

In instances where the aggregate particles are subjected to a plurality of cement coating steps, it is helpful to include an aqueous emulsion of a polymeric binder in the aqueous medium that is used for wetting the particles. The polymeric binder aids in controlling the amount of water that is present on the aggregate particles. It also aids in binding the particles together, improves coherence in the uncured matrix, and increases the strength of the final product.

When adding the additional aqueous medium for hydrating, rehydrating or crystallizing the cementitious material and providing the optimum consistency in the uncured concrete matrix or plaster matrix, it is usually preferred that controlled increments be added while the matrix is being mixed. This procedure assures that a uniform concentration of the aqueous medium is obtained throughout the matrix.

The apparatus employed to admix the lightweight aggregate with the aqueous medium and the inorganic cementitious material preferably includes blade means for scouring the sides of the mixing vessel, and slicing into and folding the matrix inward toward the center of the mass that is being mixed with the least possible drag and subsequent entrapped air. An example of a mixing apparatus of this type is a pug mill with the blade being modified to slice into the matrix and to fold it toward the center mixer, but it is understood that other suitable apparatus operating on the above principle may be employed. The order of addition of the ingredients to the mixing vessel is also of importance. For best results, the lightweight aggregate is added to the mixing vessel, followed by sufficient aqueous medium to uniformly coat the surfaces of the particles with a thin film. After mixing the aqueous medium and aggregate for a sufficient period of time to uniformly wet the surfaces of the particles, the dry cementitious material is added and the mixing is continued until the particles are uniformly coated with cement. Usually about one to two minutes are required for mixing the cement with the wet aggregate, and approximately one minute is required for wetting the beads with the aqueous medium. The additional aqueous medium in an amount to hydrate, rehydrate, or crystallize the cement and provide the desired consistency in the matrix is then added, and the mixing is continued until a uniform uncured matrix is produced. Additional ingredients also may be added, and may be admixed in the uncured matrix as discussed hereinafter.

The lightweight concrete produced in accordance with the invention has increased strength in instances where pozzolan is included in the uncured concrete matrix. As used herein, the term pozzolan embraces those substances which are capable of reacting with the lime that is released during hydration of the hydraulic cement, and especially pulverulent siliceous or siliceous-aluminous materials that react chemically with slaked lime at ordinary temperatures in the presence of moisture to form a cementitious compound. Examples of naturally occurring pozzolan include volcanic ash or minerals derived from volcanic ash, and similar siliceous or siliceous-aluminous minerals. Examples of pozzolan that is produced synthetically include fly-ash and certain slags.

The pozzolan may be added at the time of manufacturing the hydraulic cement such as when a Portland-pozzolan cement is produced. Alternatively, finely divided pozzolan may be admixed with the hydraulic cement and the cement-pozzolan mixture used to coat the wet aggregate, or the pozzolan may be admixed with the concrete matrix following the hydraulic cement.

More than one lightweight aggregate may be included in the concrete matrix or plaster matrix. For example, a mixed aggregate may be wetted initially with the aqueous medium, and then admixed with the inorganic cementitious material. It is also possible to admix additional lightweight aggregates in the concrete matrix or plaster matrix after it is produced. For best results, when lightweight aggregate is admixed with the concrete matrix or plaster matrix, it should be added in an amount less than 50% by volume of that initially present.

Finely divided hydrated lime increases the cohesive properties of the concrete matrix, and also increases the strength of the cured concrete. The hydrated lime may be added in an amount up to about 15% by weight of the hydraulic cement, and for best results, about 5–10% by weight is added.

It is usually preferred that the hydrated lime be added to the concrete matrix after making the final addition of the aqueous medium or concurrently therewith.

Inert finely divided fillers such as sand and finely crushed stone may be added to the concrete matrix or plaster matrix. The fillers increase the strength of the cured concrete or plaster, but the weight is also increased very substantially. Nevertheless, it is often possible to add the fillers in amounts up to about three times the weight of the cementitious material and produce concrete or plaster having greater strength per unit weight. For example, in some instances the strength of concrete may be tripled by making a controlled addition of inert filler to the concrete matrix after making the final water addition or concurrently therewith, and the weight is only doubled.

Conventional air entraining agents may be added to a desired matrix in the usual amounts following prior art practices. For instance, the air entraining agent may be added to the concrete matrix along with the aqueous medium, and then vigorously admixed therewith to assure that the final concrete product has numerous small internally arranged voids.

When practicing a presently preferred variant of the method of the invention for preparing concrete, the lightweight aggregate should be wetted with the aqueous medium, and thereafter the wet aggregate should be admixed with the dry hydraulic cement. It is understood that the hydraulic cement may contain other finely divided ingredients at the time that it is admixed with the wet aggregate. For instance, all or part of the finely divided pozzolan, lime, and/or inert filler may be admixed with the hydraulic cement, and the dry mixture thus produced may be admixed with the wet aggregate. As a general rule, with the possible exception of pozzolan, this is not the preferred practice and only the hydraulic cement is admixed with the wet aggregate to produce the cement-coated aggregate particles. Thereafter, the additional aqueous medium may be added, and the hydrated lime, inert filler, and/or additional light aggregate are added concurrently with or following the additional aqueous medium. The various additions are preferably made with continuous agitation of the concrete matrix so as to assure uniform distribution thereof.

For some reason which is not fully understood at the present time, the additional aqueous medium may be added to the cement-coated aggregate particles in the amount defined herein without causing the same to separate from the matrix during the mixing step. Stratification is also prevented during the curing step. As a result, the lightweight concrete or plaster prepared in accordance with the invention has the maximum possible strength per unit weight that is achievable with a given ratio and weight of ingredients. Increased compressive strength may be obtained by carefully selecting and controlling the ingredients of the mix and the amounts thereof. The amount of water in the aqueous medium should be controlled within optimum limits for maximum compressive strength of concrete. It is usually preferred to admix the lightweight aggregate for concrete with only sufficient water to provide a thin uniform film thereon, followed by admixing the dry hydraulic cement with the wet aggregate, followed by a final addition of water in an amount of about 0.3–0.5, and preferably about 0.4, times the weight of the hydraulic cement. When preparing plaster, the initial water for wetting the aggregate is the same as when preparing concrete, and the final addition of water is usually in an amount of 0.35–0.60, and preferably 0.40–0.55, times the weight of the inorganic cementitious material. It is understood that any additional water that is needed to provide a desired consistency and to produce a coherent formable matrix may be added.

In many instances, concrete products having the greatest compressive strength per unit weight are produced from a concrete matrix containing the lightweight aggregate, hydraulic cement, pozzolan and hydrated lime. Inert fillers such as sand, crushed stone and additional lightweight aggregate also are added. The ratios of Portland cement, pozzolan and hydrated lime are of importance. The pozzolan should be present in an amount less than 30% by weight of the hydraulic cement and preferably in an amount of about 10-20% by weight. The hydrated lime should be present in an amount of about 5-10% by weight of the hydraulic cement. Polystyrene beads expanded in hot water in combination with hydraulic cement, pozzolan and hydrated lime within the foregoing ranges produces optimum results in most instances. With this combination of ingredients, it is possible to prepare structural grade lightweight concretes having compressive strengths greater than 1,000 pounds per square inch, and having weights of less than 60 pounds per cubic foot, and often less than 50 pounds per cubic foot. Polystyrene beads are also preferred for plaster as a constant amount of water is absorbed, and a uniform predictable final lightweight product is produced.

The formable uncured concrete matrix produced in accordance with the invention may be used in preparing diverse products such as building blocks and bricks, and for other construction purposes such as walls, road beds, sidewalks, and foundations. The formable uncured plastic matrix of the invention may be used in preparing lightweight insulation board, and it also may be sprayed, cast and/or troweled onto surfaces in buildings and the like. The final products thus produced have a unique combination of properties as they are noncombustible, chemically inert and noncorrosive. The products are also efficient insulators, and have relatively high strength per unit weight.

The foregoing detailed description and the following specific examples are for purposes of illustration only, and are not intended as being limiting to the spirit or scope of the appended claims. The ACI method of proportions No. 613A is used herein for determining the proportions of ingredients in the concrete and plaster mixes.

Example I

This example illustrates the preparation of lightweight concrete when using first stage polystyrene beads expanded in dry steam as the lightweight aggregate. The expanded polystyrene beads weighed two pounds per cubic foot, and had diameters of approximately 1/8 inch to 1/4 inch.

The aqueous medium was water, and the hydraulic cement was an early strength Portland cement known in the art as SS-C-192, type 3. The pozzolan, hydrated lime, sand and perlite were commercial grades conventionally used in the preparation of concrete. The air entraining agent was Derex.

Concrete mixes were prepared from the ingredients set out in Table I below employing a modified pug mill as the mixing apparatus. The blade of the plug mill was modified to slice into the matrix and to fold it toward the center mixer with the least possible drag and subsequent entrapped air. The order of addition and amounts of ingredients was as they appear from left to right in Table I. In general, the expanded polystyrene beads were placed in the mixer, and then the wetting water was added. The beads were mixed with the wetting water for approximately one minute. At the end of this mixing period, the polystyrene beads were uniformly wetted with the water, and then the dry portland cement was added and the mixing was continued for approximately 1½ minutes. The matrix turned a gray color upon admixing with the Portland cement, and the beads had a uniform film of Portland cement thereon at the end of the mixing period. The air entraining agent was added to the water of hydration, and the mixture of water and air entraining agent was added and admixed. The pozzolan was admixed with the portland cement, and the portland cement-pozzolan mixture was used in coating the wetted beads. The hydrated lime, sand and perlite were added in that order after addition of the water of hydration and admixed.

The concrete matrix for each run was placed in a test mold, cured for seven days, and tested for compressive strength which was recorded in pounds per square inch. The weight of the concrete was determined and recorded in pounds per cubic foot.

The data thus obtained appear in Table I.

TABLE I

| Test | Polystyrene beads Lbs. | Polystyrene beads Cu. Ft. | Water Wetting | Water Hydration | Water Total | Cement | Pozzolan | Derex (grams) | Hydrated lime | Sand | Perlite | Weight (lbs./ft.$^3$) | Compressive strength (p.s.i.) |
|---|---|---|---|---|---|---|---|---|---|---|---|---|---|
| 1 | 0.4 | 0.2 | 1.6 | 0.09 | 1.69 | 3.92 | | | | | | 24.7 | 95.6 |
| 2 | 0.4 | 0.2 | 1.6 | 0.38 | 1.98 | 3.14 | | | 0.47 | | | 23.8 | 108.5 |
| 3 | 0.4 | 0.2 | 1.6 | 0.43 | 2.03 | 3.53 | | | 3.90 | | | 23.8 | 84.3 |
| 4 | 0.4 | 0.2 | 1.6 | 1.10 | 2.70 | 2.74 | | | 1.18 | | | 30.8 | 108.5 |
| 5 | 0.4 | 0.2 | 1.6 | 1.76 | 3.36 | 1.96 | | | 1.96 | | | 32.3 | 72.9 |
| 6 | 0.4 | 0.2 | 1.6 | 0.24 | 1.84 | 3.12 | | | 0.31 | 3.0 | | 38.0 | 113.7 |
| 7 | 0.4 | 0.2 | 1.6 | 0.58 | 2.18 | 3.81 | | | 0.38 | 3.0 | | 45.6 | 270.5 |
| 8 | 0.1 | 0.05 | 0.025 | 0.348 | 0.373 | 0.870 | | | | 1.740 | | 57.1 | 448 |
| 9 | 0.1 | 0.05 | 0.025 | 0.408 | 0.433 | 1.044 | | 2.5 | | 1.044 | | 45.5 | 435 |
| 10 | 0.1 | 0.05 | 0.025 | 0.408 | 0.433 | 1.044 | | 10.0 | | 1.044 | | 47.8 | 442 |
| 11 | 0.1 | 0.05 | 0.025 | 0.408 | 0.433 | 1.044 | | 10.0 | | | | 29.0 | 172 |
| 12 | 0.1 | 0.05 | 0.025 | 0.557 | 0.582 | 1.392 | | 10.0 | | | | 40.0 | 316 |
| 13 | 0.1 | 0.05 | 0.025 | 0.696 | 0.721 | 1.740 | | 10.0 | | | | 49.2 | 353 |
| 14 | 0.1 | 0.05 | 0.025 | 0.048 | 0.433 | 1.044 | | 10.0 | | 0.522 | | 38.2 | 229 |
| 15 | 0.1 | 0.05 | 0.025 | 0.557 | 0.582 | 1.392 | | 10.0 | | 0.696 | | 53.2 | 459 |
| 16 | 0.1 | 0.05 | 0.025 | 0.696 | 0.721 | 1.740 | | 10.0 | | 0.870 | | 68.5 | 453 |
| 17 | 0.1 | 0.05 | 0.025 | 0.702 | 0.727 | 1.392 | | | | | 0.150 | 44.4 | 450 |
| 18 | 0.1 | 0.05 | 0.025 | 0.654 | 0.679 | 1.392 | | | | | 0.100 | 33.8 | 327 |
| 19 | 0.1 | 0.05 | 0.025 | 0.702 | 0.727 | 1.392 | 0.08 | | | | 0.150 | 46.0 | 468 |
| 20 | 0.1 | 0.05 | 0.205 | 0.654 | 0.679 | 1.392 | 0.08 | | | | 0.100 | 45.3 | 309 |

Example II

The general procedure of Example I was repeated with the exception of using polystyrene beads which had been expanded in hot water having a temperature of 200-212° F. The hot water expanded polystyrene beads weighed 3.6 pounds per cubic foot, and apparently had some water entrapped within the beads. In general, the order of addition of ingredients was as in Example I, i.e., as they appear when reading from left to right in Table II.

The data thus obtained appear in Table II.

TABLE II

| Test | Polystyrene beads | | Water | | | Cement | Poz-zolan | Hydrated lime | Weight (lbs./ft.³) | Compressive strength (p.s.i.) after— | | |
|---|---|---|---|---|---|---|---|---|---|---|---|---|
| | Lbs. | Cu. ft. | Wetting | Hydration | Total | | | | | 7 days | 14 days | 28 days |
| 1 | 0.05 | 0.025 | 0.013 | 0.209 | 0.222 | 0.522 | | | 33.7 | 169 | | |
| 2 | 0.05 | 0.025 | 0.013 | 0.278 | 0.291 | 0.696 | | | 45.0 | 585 | | |
| 3 | 0.05 | 0.025 | 0.013 | 0.348 | 0.361 | 0.870 | | | 52.6 | 865 | | |
| 4 | 0.05 | 0.025 | 0.013 | 0.319 | 0.332 | 0.522 | 0.250 | | 48.8 | 723 | | |
| 5 | 0.05 | 0.025 | 0.013 | 0.388 | 0.401 | 0.696 | 0.250 | | 57.5 | 923 | | |
| 6 | 0.09 | 0.025 | 0.013 | 0.209 | 0.222 | 0.522 | | | 34.4 | 199 | 298 | 248 |
| 7 | 0.09 | 0.025 | 0.013 | 0.278 | 0.291 | 0.696 | | | 41.6 | 423 | 485 | 549 |
| 8 | 0.09 | 0.025 | 0.013 | 0.348 | 0.361 | 0.870 | | | 49.0 | 1,050 | 1,090 | 1,095 |
| 9 | 0.09 | 0.025 | 0.013 | 0.242 | 0.255 | 0.522 | 0.078 | | 36.5 | 261 | 262 | 201 |
| 10 | 0.09 | 0.025 | 0.013 | 0.323 | 0.336 | 0.696 | 0.105 | | 47.6 | 700 | 768 | 1,065 |
| 11 | 0.09 | 0.025 | 0.013 | 0.278 | 0.291 | 0.522 | 0.157 | | 41.4 | 554 | 646 | 537 |
| 12 | 0.09 | 0.025 | 0.013 | 0.369 | 0.382 | 0.696 | 0.209 | | 48.5 | 1,142 | 1,183 | 886 |
| 13 | 0.09 | 0.025 | 0.013 | 0.316 | 0.329 | 0.522 | 0.104 | 0.052 | 43.5 | 840 | 672 | 924 |
| 14 | 0.09 | 0.025 | 0.013 | 0.422 | 0.435 | 0.696 | 0.139 | 0.070 | 51.1 | 942 | 989 | 1,265 |

Example III

This example illustrates the preparation of lightweight plaster when using expanded polystyrene beads as the lightweight aggregate. The expanded polystyrene beads weighed 1.5 pounds per cubic foot, and had diameters of approximately ⅛–¼ inch.

The aqueous medium was water, and the cementitious material consisted of calcined gypsum in three runs. In an additional run, the cementitious material was a mixture of hydrated lime and calcined gypsum.

Plaster mixes were prepared from the ingredients listed in Table III employing modified pug mill as a mixing apparatus. The pug mill was modified as set out in Example I. The order of addition and the amounts of ingredients was as they appear from left to right in Table III.

In general, the expanded polystyrene beads were placed in the mixer, and wetting water was added. The beads were mixed with the wetting water for approximately one minute. At the end of this mixing period, the polystyrene beads were uniformly wetted with the water, and then the dry finely divided calcined gypsum was added and the mixing was continued for approximately 1½ minutes. At the end of the mixing period, the beads had a uniform coating of the gysum thereon. The water of rehydration was added, and the mixing was continued until a uniform formable coherent plaster matrix was produced. In the one run where a mixture of calcined gypsum and hydrated lime was used as the cementitious material, the hydrated lime was added after the water of rehydration and admixed in the matrix.

The plaster matrix for each run was placed in a test mold, cured for seven days, and tested for compressive strength which was recorded in pounds per square inch. The weight of the plaster was determined and recorded in pounds per cubic foot.

The data thus obtained appear in Table III.

TABLE III

| Test | Polystyrene beads | | Water | | | Calcined gypsum | Hydrated lime | Weight (lbs./ft.³) | Compressive strength (p.s.i.) after 7 days |
|---|---|---|---|---|---|---|---|---|---|
| | Lbs. | Cu. ft. | Wetting | Rehydration | Total | | | | |
| 1 | 1.5 | 1.0 | 0.5 | 11.85 | 12.35 | 19.58 | 4.64 | 28.2 | 65 |
| 2 | 1.5 | 1.0 | 0.5 | 11.60 | 12.10 | 27.50 | | 31.2 | 138 |
| 3 | 1.5 | 1.0 | 0.5 | 13.75 | 14.25 | 31.30 | | 35.1 | 165 |
| 4 | 1.5 | 1.0 | 0.5 | 18.40 | 18.90 | 34.35 | | 39.65 | 215 |

We claim:

1. A method of preparing lightweight concrete comprising the steps of
   (a) admixing particles of at least one lightweight concrete aggregate with a liquid aqueous medium consisting essentially of water in liquid phase to substantially uniformly deposit liquid aqueous medium on the surface of the aggregate particles and form an intimate admixture thereof, the said deposited liquid aqueous medium being present on the surfaces of the aggregate particles in the form of a separate liquid phase,
   (b) admixing dry finely divided hydraulic cement with said admixture of particles of aggregate and aqueous medium prepared by step (a) and thereby forming a coating comprising the hydraulic cement and the said deposited liquid aqueous medium on the aggregate particles,
   (c) the resulting admixture prepared by step (b) containing the hydraulic cement substantially uniformly distributed therein at the rate of about 200–1000 pounds for each cubic yard of the aggregate,
   (d) the water content of said admixture of particles of aggregate and aqueous medium prepared by step (a) being insufficient to fully hydrate all of the hydraulic cement admixed therewith in step (b) and to produce a coherent formable uncured concrete matrix,
   (e) admixing additional liquid aqueous medium consisting essentially of water in liquid phase with said admixture prepared by step (b) in an amount to fully hydrate all of the hydraulic cement and produce a coherent formable uncured concrete matrix, the said coherent formable uncured concrete matrix containing the hydraulic cement and the liquid aqueous medium in amounts whereby it sets upon standing and produces a substantially uniform lightweight concrete, the said coherent formable uncured concrete matrix containing the liquid aqueous medium in an amount insufficient to separate therefrom in the form of a separate liquid phase of the said aqueous medium,
   (f) forming said coherent formable concrete matrix into a body of uncured lightweight concrete having a desired configuration, and
   (g) maintaining said body in the desired configuration until it sets.

2. The lightweight concrete prepared by the method of claim 1.

3. The method of claim 1 wherein the aggregate comprises expanded polystyrene beads.

4. The method of claim 3 wherein the polystyrene beads are expanded in hot water.

5. The method of claim 1 wherein the uncured concrete matrix also contains admixed therein up to about 30% by weight of finely divided pozzolan based upon the weight of the hydraulic cement.

6. The method of claim 1 wherein the uncured concrete matrix also contains admixed therein up to about 15% by weight of finely divided hydrated lime based upon the weight of the hydraulic cement.

7. The method of claim 1 wherein the uncured concrete matrix also contains admixed therein a finely divided inert inorganic filler in an amount up to about three times the weight of the hydraulic cement.

8. The method of claim 1 wherein the uncured concrete matrix also contains admixed therein an effective amount of an air entraining agent.

9. The method of claim 1 wherein the aqueous medium comprises an aqueous suspension of an organic polymeric binder for the lightweight aggregate.

10. The method of claim 1 wherein the uncured concrete matrix also contains admixed therein at least one additional lightweight aggregate.

11. The method of claim 10 wherein the additional lightweight aggregate is perlite.

12. The method of claim 1 wherein the uncured concrete matrix also contains admixed therein up to about 30% by weight of finely divided pozzolan and up to about 15% by weight of finely divided hydrated lime based upon the weight of the hydraulic cement.

13. The method of claim 1 wherein the uncured concrete matrix also contains admixed therein up to about 30% by weight of finely divided pozzolan based upon the weight of the hydraulic cement and a finely divided inert inorganic filler in an amount up to about three times the weight of the hydraulic cement.

14. The method of claim 1 wherein the uncured concrete matrix also contains admixed therein a finely divided inert inorganic filler in an amount up to about three times the weight of the hydraulic cement and finely divided hydrated lime in an amount up to about 15% by weight of the hydraulic cement.

15. The method of claim 1 wherein the uncured concrete matrix also contains admixed therein up to about 30% by weight of finely divided pozzolan based upon the weight of the hydraulic cement, sand in an amount up to about three times the weight of the hydraulic cement, and finely divided hydrated lime in an amount up to about 15% by weight of the hydraulic cement.

16. The method of claim 15 wherein the concrete aggregate comprises expanded polystyrene beads.

17. The method of claim 16 wherein the polystyrene beads are expanded in hot water.

18. The method of claim 17 wherein the aqueous medium comprises an aqueous suspension of an organic polymeric binder.

19. The method of claim 18 wherein at least one additional lightweight aggregate is admixed with the concrete matrix.

20. The method of claim 19 wherein the additional lightweight aggregate is perlite.

21. A method of preparing lightweight plaster comprising the steps of
(a) admixing particles of at least one lightweight plaster aggregate with a liquid aqueous medium consisting essentially of water in liquid phase to substantially uniformly deposit liquid aqueous medium on the surface of the aggregate particles and form an intimate admixture thereof, the said deposited liquid aqueous medium being present on the surfaces of the aggregate particles in the form of a separate liquid phase,
(b) admixing at least one dry finely divided inorganic cementitious material for plaster with said admixture of particles of aggregate and aqueous medium prepared by step (a) and thereby forming a coating comprising the cementitious material and the said deposited liquid aqueous medium on the aggregate particles,
(c) the resulting admixture prepared by step (b) containing the cementitious material substantially uniformly distributed therein at the rate of about 200–1000 pounds for each cubic yard of the aggregate,
(d) the water content of said admixture of particles of aggregate and aqueous medium prepared by step (a) being insufficient to produce a fully settable coherent formable uncured plaster matrix,
(e) admixing additional liquid aqueous medium consisting essentially of water in liquid phase with said admixture prepared by step (b) in an amount to produce a fully settable coherent formable uncured plaster matrix, the said coherent formable uncured plaster matrix containing the cementitious material and the liquid aqueous medium in amounts whereby it fully sets upon standing and produces a substantially uniform lightweight plaster, the said coherent formable uncured plaster matrix containing the liquid aqueous medium in an amount insufficient to separate therefrom in the form of a separate liquid phase of the said aqueous medium,
(f) forming said coherent formable uncured plaster matrix into a body of uncured lightweight plaster having a desired configuration, and
(g) maintaining said body in the desired configuration until it sets.

22. The lightweight plaster prepared by the method of claim 21.

23. The method of claim 21 wherein the aggregate comprises expanded polystyrene beads.

24. The method of claim 23 wherein the polystyrene beads are expanded in hot water.

25. The method of claim 21 wherein the cementitious material is selected from the group consisting of calcined gypsum, hydrated lime, portland cement and admixtures thereof.

26. The method of claim 21 wherein the uncured plaster matrix also contains admixed therewith a finely divided inert inorganic filler in an amount up to about three times the weight of the cementitious material.

27. The method of claim 21 wherein the aqueous medium comprises an aqueous suspension of an organic polymeric binder for the lightweight aggregate.

28. The method of claim 21 wherein the uncured plaster matrix also contains admixed therewith at least one additional lightweight aggregate.

29. The method of claim 21 wherein the cementitious material comprises calcined gypsum.

30. The method of claim 29 wherein the lightweight aggregate comprises expanded polystyrene beads.

31. The method of claim 21 wherein the cementitious material comprises hydrated lime.

32. The method of claim 31 wherein the lightweight aggregate comprises expanded polystyrene beads.

33. The method of claim 1 wherein said steps (a) and (b) are repeated a plurality of times before admixing said additional aqueous medium in said step (e).

34. The method of claim 21 wherein said steps (a) and (b) are repeated a plurality of times before admixing said additional aqueous meduim in said step (e).

References Cited
UNITED STATES PATENTS

| | | | |
|---|---|---|---|
| 756,798 | 4/1904 | Pierce | 106—97 X |
| 939,072 | 11/1909 | Ney | 106—97 X |
| 1,711,027 | 4/1929 | Luzzatti et al. | 106—97 |
| 2,303,629 | 12/1942 | Gelinas | 106—97 X |
| 2,315,732 | 4/1943 | Patch | 106—97 X |
| 2,703,289 | 3/1955 | Willson | 106—97 X |
| 2,987,406 | 6/1961 | Minnick | 106—97 |
| 3,192,060 | 6/1965 | Tilsen | 106—97 |
| 3,232,777 | 2/1966 | Bush | 106—97 X |
| 3,503,771 | 3/1970 | Kroyer | 106—97 X |
| 3,565,650 | 2/1971 | Cordon | 106—97 |
| 3,021,291 | 2/1962 | Thiessen | 264—DIG. 7 |

(Other references on following page)

| | | | |
|---|---|---|---|
| 3,214,393 | 10/1965 | Sefton | 260—2.5 B |
| 3,251,916 | 5/1966 | Newnham et al. | 260—2.5 B X |
| 3,257,338 | 6/1966 | Sefton | 260—2.5 B |
| 3,272,765 | 9/1966 | Sefton | 260—2.5 B |
| 2,787,809 | 4/1957 | Stastny | 264—53 |
| 3,468,993 | 9/1969 | Bielich | 264—333 X |

FOREIGN PATENTS

| | | | |
|---|---|---|---|
| 33,363 | 2/1884 | Great Britain | 106—97 |
| 23,786 | 11/1963 | Japan | 264—DIG. 7 |
| 1,329,415 | 7/1962 | France | 264—DIG. 7 |
| 1,474,167 | 2/1967 | France | 264—DIG. 7 |

PHILIP E. ANDERSON, Primary Examiner

U.S. Cl. X.R.

106—97, 111, 119; 260—2.5 B, 2.5 HB; 264—42, 122, 333, DIG. 7